(12) United States Patent
Moeckel

(10) Patent No.: US 6,557,345 B1
(45) Date of Patent: *May 6, 2003

(54) INTEGRATED TURBOCHARGER FAN INTERCOOLER WITH PARTIAL ISOTHERMAL COMPRESSION

(75) Inventor: Mark D. Moeckel, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/022,642

(22) Filed: Dec. 17, 2001

(51) Int. Cl.[7] ............................................. F02B 29/04
(52) U.S. Cl. .................... 60/599; 60/605.1; 415/178
(58) Field of Search ................. 60/597, 599, 605.1; 415/178

(56) References Cited

U.S. PATENT DOCUMENTS

| | | | |
|---|---|---|---|
| 2,366,365 A | * | 1/1945 | Sorensen ................... 60/599 |
| 2,367,223 A | * | 1/1945 | Larreco ..................... 60/599 |
| 2,682,365 A | | 6/1954 | Pielstick |
| 3,143,103 A | | 8/1964 | Zuhn |
| 3,211,362 A | * | 10/1965 | Laskey et al. ............ 60/599 X |
| 3,257,797 A | | 6/1966 | Lieberherr |
| 3,829,235 A | | 8/1974 | Woollenweber, Jr. |
| 3,946,565 A | | 3/1976 | Cutler |
| 4,068,612 A | | 1/1978 | Meiners |
| 4,075,991 A | | 2/1978 | Mettig et al. |
| 4,911,135 A | | 3/1990 | Nishimura et al. |
| 4,918,923 A | | 4/1990 | Woollenweber et al. |
| 5,036,668 A | | 8/1991 | Hardy |
| 5,261,356 A | | 11/1993 | Takahashi et al. |
| 5,551,234 A | * | 9/1996 | Ochoizki ................... 60/599 |

* cited by examiner

Primary Examiner—Hoang Nguyen
(74) Attorney, Agent, or Firm—Todd T Taylor

(57) ABSTRACT

An integrated cooling system for a turbocharger, suitable for an internal combustion engine. A cooling air shroud surrounds a portion of an interstage duct in a two-stage turbocharger, and may also surround a part of the outlet from the turbocharger. A fan on a turbocharger shaft is driven by the turbocharger turbine to draw air into the cooling air shroud, and pass the cooling air in heat exchange relationship with compressed air flowing through the turbocharger. The fan may also be used to precompress air compressed in the turbocharger.

16 Claims, 2 Drawing Sheets

INTEGRATED TURBOCHARGER FAN INTERCOOLER WITH PARTIAL ISOTHERMAL COMPRESSION

TECHNICAL FIELD

The present invention relates to turbochargers for use in internal combustion engines, and, more particularly, to a turbocharger having an integrated cooling system.

BACKGROUND

A limiting factor in the performance of an internal combustion engine is the amount of combustion air that can be delivered to the intake manifold for combustion in the engine cylinders. Atmospheric pressure is often inadequate to supply the required amount of air for proper operation of an engine.

An internal combustion engine, therefore, may include one or more turbochargers for compressing air to be supplied to one or more combustion chambers within corresponding combustion cylinders. The turbocharger supplies combustion air at a higher pressure and higher density than existing atmospheric pressure and ambient density. The use of a turbocharger can compensate for lack of power due to altitude, or to increase the power that can be obtained from an engine of a given displacement, thereby reducing the cost, weight and size of an engine required for a given power output.

Each turbocharger typically includes a turbine driven by exhaust gases from the engine, and a compressor driven by the turbine. The compressor receives the air to be compressed and supplies the air to the combustion chamber. It is known to provide higher compression levels through the use of a multi-stage turbocharger. A known multi-stage turbocharger includes a turbine and compressor section having two or more compressors. A common shaft interconnects the turbine wheel of the turbine with compressor wheels in the compressor section. A stream of exhaust gases from the engine is conducted from the exhaust manifold to the turbine. The stream of exhaust gases passing through the turbine causes the turbine wheel to rotate, thereby turning the common shaft interconnecting the turbine wheel and the compressor wheels and rotating the compressor wheels.

Ambient air to be used for combustion in the internal combustion engine is brought into the compressor section, through an inlet for the first compressor. The air is compressed by the first compressor wheel, and passes from the first compressor through a first compressor outlet and an interstage duct to the inlet of the second compressor in the compressor section, for farther compression. The out flow from the second compressor exits the compressor section of the turbocharger at the second compressor outlet, and is directed to the inlet manifold of the internal combustion engine.

Several problems are experienced with previously known constructions for turbochargers as described above. Compressing the air in the first compressor significantly raises the temperature of the air, increasing the power required by the second compressor to achieve a desire pressure boost. To overcome the detrimental effects of the increase in temperature, so-called "intercoolers" have been provided in the flow path between the first compressor outlet and the second compressor inlet. A known intercooler is a remote unit, often somewhat distant from the turbocharger, increasing the complexity of the turbocharger system and the ducting for gas flow between compressors. Similarly, so-called "aftercoolers" have been used after the second compressor, to cool the compressed air supplied to the intake manifold. Cooling compressed air supplied to the intake manifold increases the oxygen content per unit volume to better support combustion in the cylinders, and decreases engine operating temperatures. High engine operating temperature has been associated with higher emission levels from the engine. Again, known designs for aftercoolers have included satellite heat exchangers which have added to the complexity of the turbocharger system.

U.S. Pat. No. 3,829,235 (Woollenweber, Jr.) discloses a single stage turbocharger compressor in which vanes are formed to provide frontal vane portions extending radially beyond adjoining vane portions. An internal wall of the compressor cover forms two discrete passages, one for air flow induced by the radially extending vanes, which is at low temperature and low pressure; and the other for flow induced by the adjoining vane portions which is at high temperature and higher pressure. Heat exchange may occur across the wall between the two air flow paths, before both air flows are directed to an external heat exchanger.

The present invention is directed to overcoming one or more of the problems as set forth above.

SUMMARY OF THE INVENTION

In one aspect of the invention, an internal combustion engine is provided with a plurality of combustion cylinders; an exhaust manifold associated with the combustion cylinders; and an intake manifold associated with the combustion cylinders. A turbocharger includes a shaft; a turbine having a turbine casing, and a turbine wheel disposed on the shaft in the turbine housing. A turbine inlet and a turbine outlet in the casing are associated with the turbine wheel. The turbine inlet is connected in fluid flow communication with the exhaust manifold. A compressor section has an inlet and an outlet, the inlet associated with a source of combustion gas, and the outlet associated with the intake manifold. A cooling system has a cooling air shroud at least partially surrounding the compressor section. The cooling air shroud has a cooling air inlet and a cooling air outlet. A fan is drivingly connected to the shaft and operatively disposed in the cooling air inlet.

In another aspect of the invention, a turbocharger is provided with a shaft; a turbine including a turbine casing, a turbine wheel mounted on the shaft in the casing and a turbine inlet and a turbine outlet in the casing associated with the turbine wheel. A compressor section includes a first compressor having a first compressor casing, a first compressor wheel disposed on the shaft in the first compressor casing, and a first compressor inlet and first compressor outlet in the first compressor casing associated with the first compressor wheel. A cooling air shroud has a cooling air inlet and a cooling air outlet. A fan is drivingly connected to the shaft.

In yet another aspect of the invention, a method is provided for cooling a turbocharger having a shaft, a turbine wheel operatively disposed on the shaft for rotating the shaft, and a compressor section having a compressor wheel mounted on the shaft and a compressor casing defining an inlet and an outlet, the method comprises steps of providing a cooling air shroud; providing a cooling air inlet and a cooling air outlet for the cooling air shroud; providing a fan operatively disposed in the cooling air shroud; rotating the fan by rotation of the shaft; and circulating cooling air through the cooling air shroud in heat exchange relationship with compressed gas flowing through the compressor section.

DETAILED DESCRIPTION

Figure 1:
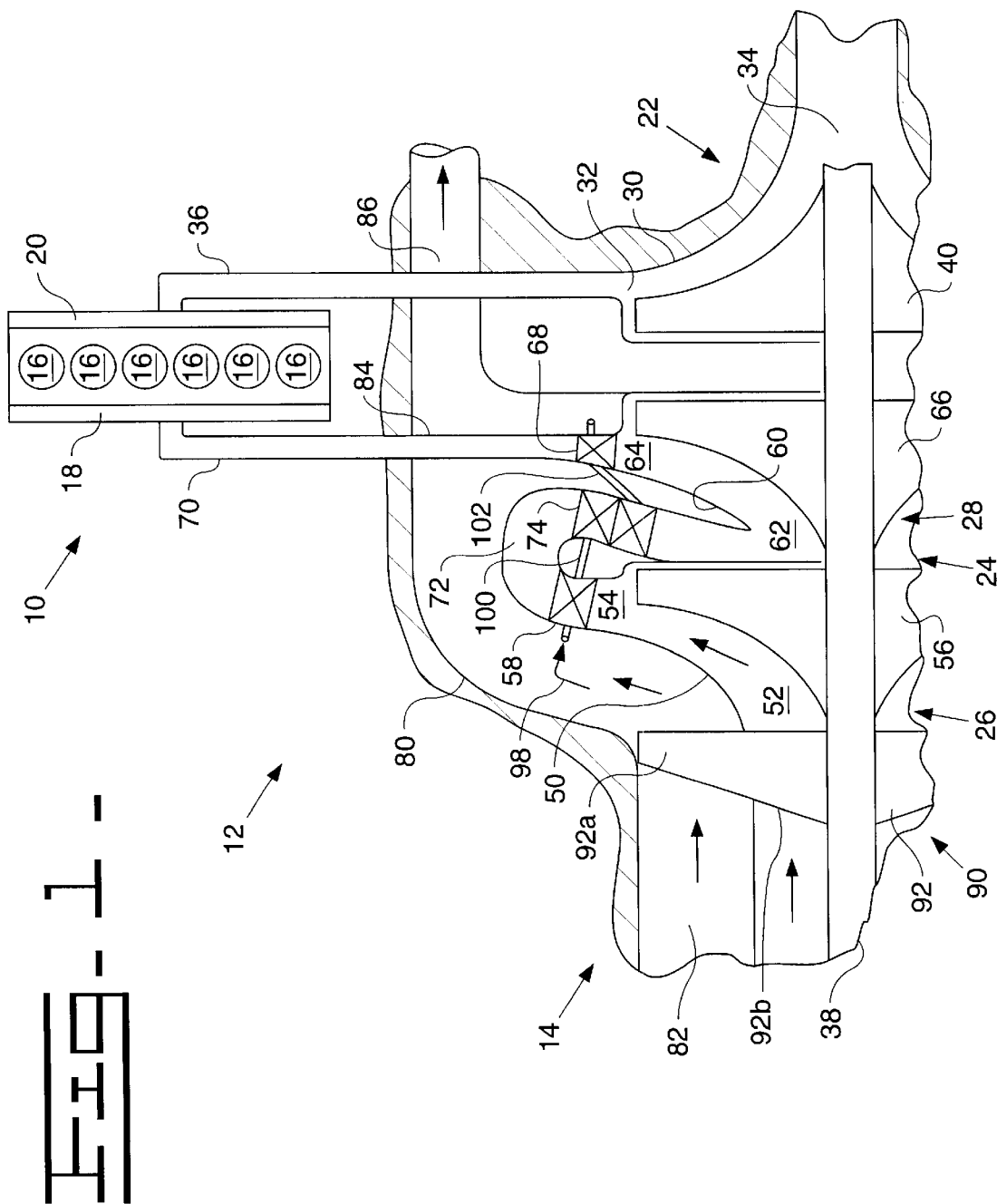
FIG. 1 is cross sectional view of a turbocharger for an internal combustion engine, the turbocharger having integrated fan cooling in accordance with the present invention.

Referring now to the drawings, and particularly to FIG. 1, an internal combustion engine 10 is shown, including a turbocharger 12 having an integrated cooling system 14 in accordance with the present invention.

Internal combustion engine 10 includes a plurality of combustion cylinders 16, and as shown in FIG. 1, includes six combustion cylinders 16, although more or fewer combustion cylinders 16 can be provided. Each combustion cylinder 16 is coupled with an intake manifold 18 and with an exhaust manifold 20. While a single intake manifold 18 is shown, it should be understood that more than one intake manifold may be used, with each intake manifold 18 coupled to a plurality of combustion cylinders 16, for providing an air mixture to each combustion cylinder 16. Further, while a single exhaust manifold 20 is shown, it should be understood that more than one exhaust manifold may be provided, with each exhaust manifold coupled to a different plurality of combustion cylinders 16. A fuel, such as diesel fuel, is injected into each combustion cylinder and combusted therein, in a known manner.

Turbocharger 12 includes a turbine 22 and a compressor section 24 having a first compressor 26 and a second compressor 28. Turbine 22 includes a turbine casing 30 defining a turbine inlet 32 and a turbine outlet 34. Turbine inlet 32 is connected in flow communication with exhaust manifold 20 via a fluid conduit 36. Turbine outlet 34 is connected to a further exhaust system (not shown) of engine 10, which may include one or more mufflers, with subsequent discharge to an ambient environment.

Turbocharger 12 further includes a shaft 38 rotatably disposed in turbocharger 12, and extending through turbine 22 and compressor section 24. A turbine wheel 40 is carried by shaft 38 in turbine casing 30, near one end of shaft 38. Turbine inlet 32 and turbine outlet 34 are each associated with turbine wheel 40, in known manner, such that a stream of exhaust gases from exhaust manifold 20 enters turbine inlet 32 and flows past turbine wheel 40 to turbine outlet 34, causing rotation of turbine wheel 40 and shaft 38.

First compressor 26 includes a first compressor casing 50 defining a first compressor or compressor section inlet 52 and a first compressor outlet 54. First compressor inlet 52 receives combustion gas from a source such as ambient air, and first compressor outlet 54 supplies compressed combustion gas to engine 10, as will be described hereinafter.

A first compressor wheel 56 is carried on shaft 38 in first compressor casing 50. First compressor inlet 52 and first compressor outlet 54 are each associated with first compressor wheel 56, in known manner, such that fluid, such as ambient air, entering first compressor 26 through first compressor inlet 52 is compressed by first compressor wheel 56 in first compressor casing 50, while flowing to first compressor outlet 54. Diffuser vanes 58 are provided in the area of first compressor outlet 54.

Second compressor 28 includes a second compressor casing 60 defining a second compressor inlet 62 and a second compressor, or compressor section outlet 64. A second compressor wheel 66 is carried on shaft 38 in second compressor casing 60. Second compressor inlet 62 and second compressor outlet 64 are each associated with second compressor wheel 66, in known manner, such that fluid entering second compressor 28 through second compressor inlet 62 is compressed by second compressor wheel 66 in second compressor casing 60, while flowing to second compressor outlet 64. Diffuser vanes 68 are provided in the are of second compressor outlet 64. Second compressor outlet 64 is connected to intake manifold 18 via a fluid conduit 70.

As illustrated in FIG. 1, an interstage duct 72 is provided, establishing fluid flow communication between first compressor outlet 54 and second compressor inlet 62. Interstage duct 72 includes deswirling vanes 74 leading to second compressor inlet 62.

Cooling system 14 includes a cooling air shroud 80 surrounding at least a portion of compressor section 24. As illustrated in FIG. 1, cooling air shroud 80 surrounds interstage duct 72 as well as a second compressor outlet 64. Cooling air shroud 80 defines a cooling air inlet 82 and a cooling air outlet 84. Cooling air inlet 82 is disposed adjacent first compressor inlet 52, and, as shown, comprises a passage immediately radially outward of first compressor inlet 52. Cooling air outlet 84 defines a discharge passage 86 for air flow from cooling air shroud 80, and may discharge cooling air from cooling system 14 to an ambient environment, to the aforementioned further exhaust system (not shown), or the like.

Figure 2:
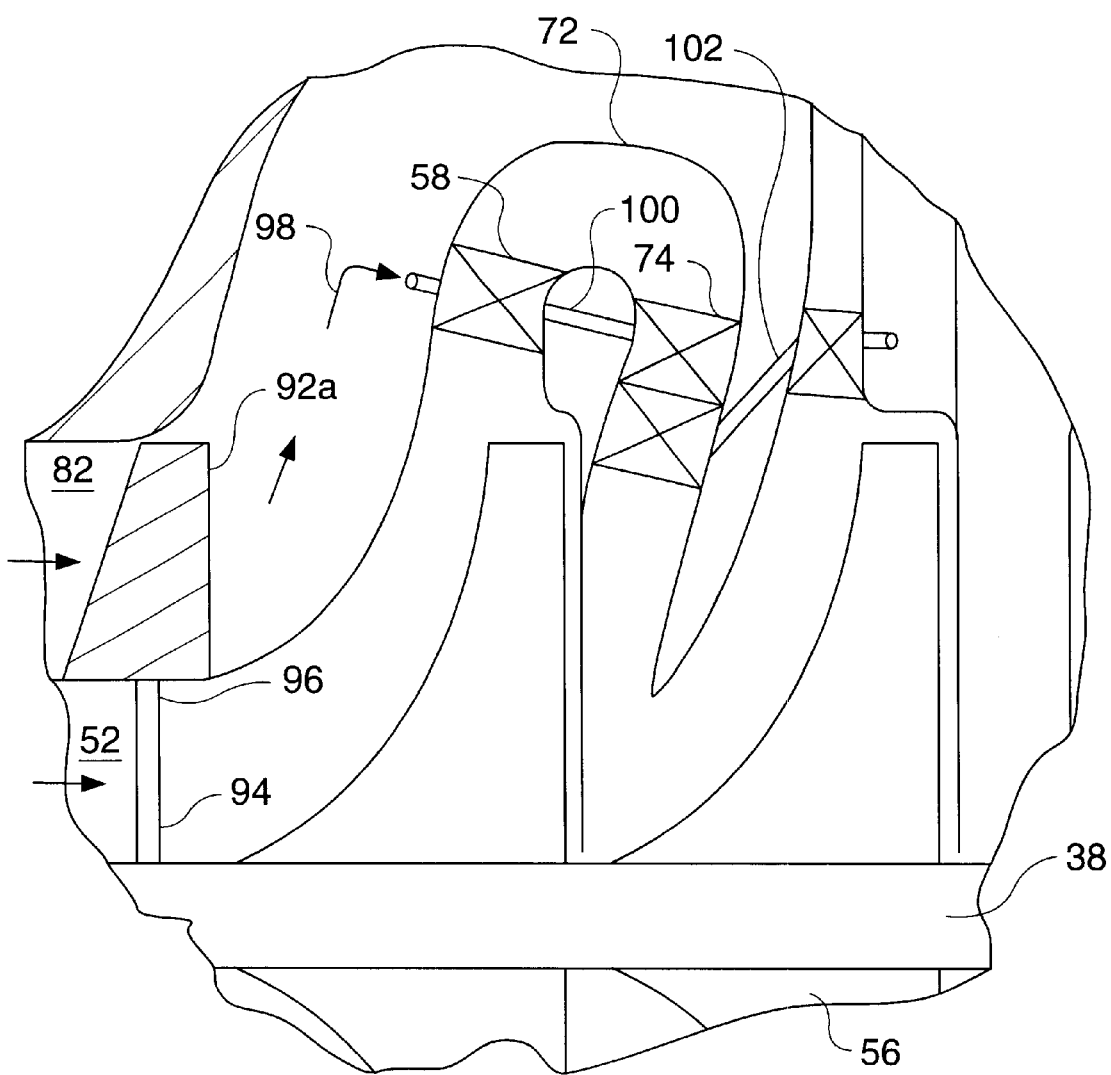
FIG. 2 is a cross sectional view of a portion of the turbocharger shown in FIG. 1, illustrating a modified form of the present invention.

A fan 90 is mounted on shaft 38, axially outwardly of first compressor wheel 56, and includes a plurality of fan blades 92 for inducing air flow through cooling air inlet 82. FIG. 1 illustrates an embodiment in which fan blades 92 extend radially outwardly from shaft 38, and include portions 92a operatively disposed in cooling air inlet 82, and 92b operatively disposed in first compressor inlet 52. Fan blade portions 92a and 92b may be an integral, single-piece body. FIG. 2 illustrates a second embodiment of the invention in which fan blades 92 include only the portion 92a provided in cooling air inlet 82. An arm 94 is provided for each fan blade 92, to connect a respective fan blade portion 92a to shaft 38. Each fan blade portion 92a is attached to a distal end 96 of a respective arm 94 supporting it. Thus, in the embodiment shown in FIG. 2, each fan blade 92 comprises only portion 92a operatively disposed in cooling air inlet 82, and the respective arm 94 to which blade portion 92a is attached. Each arm 94 is connected to shaft 38, and extends outwardly therefrom, through first compressor inlet 52.

FIG. 1 illustrates cooling air shroud 80 encompassing interstage duct 72 and second compressor outlet 64. If after-cooling is not required, cooling air shroud 80 need surround only some or all of interstage duct 72. However, if cooling air shroud 80 also surrounds a portion of second compressor outlet 64, both interstage and afterstage cooling can be provided.

Diffuser vanes 58 and 68, and deswirling vanes 74 can be hollow bodies functioning as part of cooling system 14. Cooling air from cooling air shroud 80 enters diffuser vanes 58 as indicated by arrow 98. Cooling air conduits 100 and 102 interconnect, respectively, diffuser vanes 58 with deswirling vanes 74, and deswirling vanes 74 with diffuser vanes 68. Alternatively, each diffuser vanes 58 and 68, and deswirling vanes 74 may be directly connected with the interior volume of cooling air shroud 80, and cooling air conduits 100 and 102 can be omitted.

INDUSTRIAL APPLICABILITY

During use of engine 10, a fuel, such as diesel fuel, is injected into combustion cylinders 16 and combusted when a piston (not shown) disposed within each combustion cylinder 16 is at or near a top dead center position. Exhaust gas is transported from each combustion cylinder 16 to exhaust manifold 20. At least a portion of the exhaust gas within exhaust manifold 20 is transported to conduit 36 and turbine inlet 32, to flow through turbine 22, for rotatably driving turbine wheel 40. The spent exhaust gas is discharged from turbine 22 through turbine outlet 34. An exhaust gas re-circulation (EGR) system (not shown) may be provided to re-circulate a portion of exhaust gas from exhaust manifold 20 to intake manifold 18, for the known advantages of EGR systems.

Rotation of turbine wheel 40 by the flow of exhaust gases through, and operation of, turbine 22 rotates shaft 38, first compressor wheel 56 and second compressor wheel 66. First compressor 26 draws combustion air into first compressor inlet 52. The combustion air is compressed within first compressor 26 and is discharged from first compressor 26 through first compressor outlet 54, flowing past diffuser vanes 58. The compressed combustion air is conducted to second compressor inlet 62 via interstage duct 72, flowing past deswirling vanes 74. Second compressor 28 further compresses the combustion air, discharging the now high pressure combustion air through second compressor outlet 64. The highly compressed combustion air flows past diffuser vanes 68 and through conduit 70 to intake manifold 18.

Rotation of shaft 38 by turbine 22 also causes rotation of fan 90, disposed on shaft 38. As fan 90 rotates, cooling air is drawn into cooling air shroud 80 by the operation of blade portions 92a in cooling air inlet 82. Air entering cooling air shroud 80 flows past and around interstage duct 72, in heat exchange relationship with compressed air flowing through interstage duct 72, as the cooling air flows toward cooling air outlet 84. Since the compressed air from first compressor 26 is at higher temperature than the ambient air entering cooling air shroud 80, heat is transferred from the compressed air in interstage duct 72 to the cooling air in cooling air shroud 80. Thus, the temperature of air entering second compressor inlet 62 is decreased, and the power required by second compressor 28 to achieve a desired additional pressure boost is reduced.

If cooling air shroud 80 also surrounds a portion of second compressor outlet 64, heat is transferred from the highly compressed air in second compressor outlet 64 to the air flowing through cooling air shroud 80. Even though cooling air reaching second compressor outlet 64 will be at a higher temperature than the ambient cooling air entering cooling air shroud 80, having been raised in temperature by the transfer of heat from compressed air flowing through interstage duct 72; with sufficient cooling air flow, the cooling air will still be at temperature below that of the compressed air leaving second compressor 28. Heat is transferred from the compressed air to the cooling air, and cooler intake air is provided to intake manifold 18 for the known advantages thereof.

Further cooling of the compressed air in interstage duct 72 and of the highly compressed air discharged from second compressor 28 is achieved as the compressed air flows past diffuser vanes 58, deswirling vanes 74 and diffuser vanes 68. Cooling air flows through the interior of hollow diffuser vanes 58 and 68 and deswirling vanes 74, in heat exchange relationship with the compressed air flowing past diffuser vanes 58 and 68 and deswirling vanes 74, along the exterior surfaces thereof.

Efficient cooling is provided by heat transfer from the compressed air to the cooling air through the material of diffuser vanes 58 and 68 and deswirling vanes 74, and by heat transfer the material of interstage duct 72. Additional cooling occurs by heat transfer through the material of any portions of first compressor casing 50 or second compressor casing 60 which are surrounded by cooling air shroud 80 such that cooling air flows along an exterior surface of the casings 50 or 60.

In accordance with the embodiment shown in FIG. 1, blades 92 include blade portions 92b operatively disposed in first compressor inlet 52. Blades portions 92b thereby provide a level of pre-compression, or pre-boost, for air flowing through first compressor inlet 52. If pre-boost is not desired, the embodiment shown in FIG. 2 may be used, whereby arms 94 are provided in first compressor inlet 52, between shaft 38 and fan blade portions 92a. Arms 94 may be aerodynamically designed to minimize influence on combustion air entering first compressor inlet 52.

The turbocharger of the present invention provides a compact arrangement for a multistage turbocharger, with increased turbocharger performance through efficient interstage cooling and aftercooling. While shown and described for a turbocharger having two compressors, those skilled in the art will readily understand how the present invention may also be used for turbochargers having more than two compressors, or for cooling the boost air from a single stage turbocharger.

Other aspects, objects and advantages of this invention can be obtained from a study of the drawings, the disclosure and the appended claims.

What is claimed is:

1. An internal combustion engine comprising:
   a plurality of combustion cylinders;
   an exhaust manifold associated with said combustion cylinders;
   an intake manifold associated with said combustion cylinders; and
   a turbocharger including:
      a shaft;
      a turbine having a turbine casing, a turbine wheel disposed on said shaft in said turbine casing, a turbine inlet and a turbine outlet in said turbine casing associated with said turbine wheel, said turbine inlet connected in fluid flow communication with said exhaust manifold;
      a compressor section having an inlet and an outlet, said inlet associated with a source of combustion gas, and said outlet associated with said intake manifold; said compressor section including a first compressor casing, a first compressor wheel disposed on said shaft in said first compressor casing, a first compressor inlet and a first compressor outlet in said first compressor casing associated with said first compressor wheel; a second compressor having a second compressor casing, a second compressor wheel mounted on said shaft in said second compressor casing, and a second compressor inlet and second compressor outlet in said second compressor casing associated with said second compressor wheel; an interstage duct connecting said first compressor outlet to said second compressor inlet; and
      a cooling system having a cooling air shroud at least partially surrounding said interstage duct, said cooling air shroud having a cooling air inlet and a cooling air outlet, said cooling air inlet disposed adjacent said first compressor inlet, and a fan drivingly connected to said shaft and operatively disposed in said cooling air inlet.

2. The internal combustion engine of claim 1, including diffuser vanes associated with said first compressor outlet and with said second compressor outlet, and deswirling vanes associated with said second compressor inlet, at least some of said vanes in flow communication with said cooling air shroud.

3. The internal combustion engine of claim 1, said cooling air shroud at least partially surrounding said second compressor outlet.

4. The internal combustion engine of claim 3, said fan including blades mounted on said shaft and having blade portions operatively disposed in said cooling air inlet.

5. The internal combustion engine of claim 4, said blades extending from said shaft into said cooling air inlet, and having blade portions thereof operatively disposed in said first compressor inlet.

6. The internal combustion engine of claim 4, said fan having arms extending from said shaft radially outwardly through said first compressor inlet, said blade portions being attached to distal ends of said arms.

7. A turbocharger comprising:
a shaft;
a turbine including a turbine casing, a turbine wheel mounted on said shaft in said turbine casing, and a turbine inlet and a turbine outlet in said turbine casing associated with said turbine wheel;
a compressor section including a first compressor having a first compressor casing, a first compressor wheel disposed on said shaft in said first compressor casing, and a first compressor inlet and first compressor outlet in said first compressor casing associated with said first compressor wheel; a second compressor having a second compressor casing, a second compressor wheel mounted on said shaft in said second compressor casing, and a second compressor inlet and second compressor outlet in said second compressor casing associated with said second compressor wheel; and an interstage duct connecting said first compressor outlet to said second compressor inlet;
a cooling air shroud at least partially surrounding said compressor section, said cooling air shroud having a cooling air inlet and a cooling air outlet, said cooling air shroud at least partially surrounding said interstage duct; and
a fan drivingly connected to said shaft, and having fan blades operatively disposed in said cooling air shroud.

8. The turbocharger of claim 7, including diffuser vanes associated with said first compressor outlet and with said second compressor outlet, and deswirling vanes associated with said second compressor inlet, at least some of said vanes in flow communication with said cooling air shroud.

9. The turbocharger of claim 7, said cooling air shroud at least partially surrounding said second compressor outlet.

10. The turbocharger of claim 7, said first compressor inlet and said cooling air inlet being adjacent each other, and said fan having fan blade portions operatively disposed in said cooling air inlet.

11. The turbocharger of claim 10, said fan blades having portions operatively extending at least partially into said first compressor inlet.

12. The turbocharger of claim 11, said cooling air shroud at least partially surrounding said second compressor outlet.

13. A method for cooling a turbocharger having a shaft, a turbine wheel operatively disposed on said shaft for rotating said shaft, and a compressor section, said method comprising steps of:
providing a cooling air shroud;
providing a cooling air inlet and a cooling air outlet for said cooling air shroud;
providing a fan including fan blades operatively disposed in said cooling air shroud;
rotating said fan by rotation of said shaft;
circulating cooling air through said cooling air shroud in heat exchange relationship with compressed gas flowing through said compressor section; and
providing in said compressor section a first compressor having a first compressor inlet and a first compressor outlet, and a second compressor having a second compressor inlet and a second compressor outlet; providing an interstage duct from said first compressor outlet to said second compressor inlet; and circulating air flow through said cooling air shroud in heat exchange relationship with compressed gas flowing through said interstage duct.

14. The method of claim 13, including circulating cooling air through said cooling air shroud in heat exchange relationship with compressed gas flowing through said second compressor outlet.

15. The method of claim 13, including providing operative portions of said fan blades in said first compressor inlet; and rotating said fan and precompressing air entering said first compressor inlet.

16. The method of claim 13, including providing vanes in said compressor section; altering flow of a compressed air stream flowing around said vanes in said compressor section; and conducting cooling air flow through said vanes.

* * * * *